United States Patent
Jesionowski et al.

(12) 
(10) Patent No.: US 6,480,905 B1
(45) Date of Patent: Nov. 12, 2002

(54) DATA STORAGE LIBRARY WITH EFFICIENT CARTRIDGE INSERT

(75) Inventors: Leonard George Jesionowski, Tucson, AZ (US); William Henry Travis, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/459,413

(22) Filed: Dec. 11, 1999

(51) Int. Cl.$^7$ ................................................. G06F 3/00
(52) U.S. Cl. ........................ 710/8; 711/115; 711/153; 710/3
(58) Field of Search .................... 700/214; 714/44, 714/42; 711/153, 115; 710/8, 9, 3; 235/383

(56) References Cited

U.S. PATENT DOCUMENTS

| | | | |
|---|---|---|---|
| 5,119,486 A | | 6/1992 | Albonesi ..................... 395/425 |
| 5,271,098 A | | 12/1993 | Khan et al. .................. 395/400 |
| 5,303,214 A | | 4/1994 | Kulakowski et al. ......... 369/34 |
| 5,303,360 A | | 4/1994 | Hilton et al. ................ 395/425 |
| 5,513,156 A | * | 4/1996 | Hanaoka et al. .......... 360/98.04 |
| 5,564,033 A | * | 10/1996 | Takekuma et al. ............. 710/13 |
| 5,802,544 A | | 9/1998 | Combs et al. .................. 711/5 |
| 5,883,864 A | | 3/1999 | Saliba .......................... 369/30 |
| 5,966,510 A | * | 10/1999 | Carbonneau et al. ......... 710/18 |
| 6,044,442 A | * | 3/2000 | Jesionowski ................ 711/100 |
| 6,045,041 A | * | 4/2000 | Tanaka et al. ............... 235/383 |
| 6,328,766 B1 | * | 12/2001 | Long ........................... 360/131 |
| 6,338,006 B1 | * | 1/2002 | Jesionowski et al. ....... 700/214 |

\* cited by examiner

*Primary Examiner*—Jeffrey Gaffin
*Assistant Examiner*—Harold Kim
(74) *Attorney, Agent, or Firm*—Dan Hubert & Assoc.

(57) ABSTRACT

A location-centric library host manages cartridge movement according to functional storage addresses and functional I/O addresses. In reality, the library has multiple data storage cartridge receiving slots, which include physical I/O slots and physical storage slots. In contrast with the physical I/O slots and physical storage slots, functional I/O addresses and functional storage addresses are virtual locations used by the host in managing cartridge locations. Thus, host knowledge of cartridge locations is limited to their functional addresses. The library includes a library map that correlates functional addresses with physical addresses. The library automatically empties new cartridges from the physical I/O slots into physical storage slots, using various steps. First, the library hardware automatically recognizes external placement of cartridges into the physical I/O slots. In response, the library identifies an empty one of the physical storage slots, and moves the cartridge into the empty physical storage slot. Additionally, the library associates a functional I/O address with the physical storage slot containing the cartridge. Eventually, the library receives an insert command from the host, requesting transfer of the cartridge from its functional I/O address to a functional storage address. The library can immediately report the already-completed move in response to any host status requests. Ultimately, in response to the insert command, the library associates the physical storage slot that already contains the cartridge with a functional storage address, instead of the preceding functional I/O address.

20 Claims, 4 Drawing Sheets

DATA STORAGE LIBRARY WITH EFFICIENT CARTRIDGE INSERT

BACKGROUND OF THE INVENTION

1. Field of the Invention

The present invention relates to data storage libraries housing multiple tapes or other data storage cartridges in various slots. More particularly, the invention concerns a data storage library that efficiently utilizes physical input/output ("I/O") slots by automatically removing cartridges into physical storage slots, and by using functional addresses to conduct virtual cartridge inserts.

2. Description of the Related Art

Many data processing systems require a large amount of data storage, for use in efficiently accessing, modifying, and re-storing data. Data storage is typically separated into several different levels, each level exhibiting a different data access time or data storage cost. A first, or highest level of data storage involves electronic memory, usually dynamic or static random access memory ("DRAM" or "SRAM"). Electronic memories take the form of semiconductor integrated circuits where millions of bytes of data can be stored on each circuit, with access to such bytes of data measured in nanoseconds. The electronic memory provides the fastest access to data since access is entirely electronic.

A second level of data storage usually involves direct access storage devices ("DASD"). DASD storage, for example, includes magnetic and/or optical disks. Data bits are stored as micrometer-sized magnetically or optically altered spots on a disk surface, representing the "ones" and "zeros" that comprise the binary value of the data bits. Magnetic DASD includes one or more disks that are coated with remnant magnetic material. The disks are rotatably mounted within a protected environment. Each disk is divided into many concentric tracks, or closely spaced circles. The data is stored serially, bit by bit, along each track. An access mechanism, known as a head disk assembly ("HDA") typically includes one or more read/write heads, and is provided in each DASD for moving across the tracks to transfer the data to and from the surface of the disks as the disks are rotated past the read/write heads. DASDs can store gigabytes of data, and the access to such data is typically measured in milliseconds (orders of magnitudes slower than electronic memory). Access to data stored on DASD is slower than electronic memory due to the need to physically position the disk and HDA to the desired data storage location.

A third or lower level of data storage includes tapes, tape libraries, and optical disk libraries. Access to library data is much slower than electronic or DASD storage because a robot or human is necessary to select and load the needed data storage medium. An advantage of these storage systems is the reduced cost for very large data storage capabilities, on the order of Terabytes of data. Furthermore, tape storage is especially useful for backup purposes. That is, data stored at the higher levels of data storage hierarchy is reproduced for safe keeping on magnetic tape. Access to data stored on tape and/or in a library is presently on the order of seconds.

There are a number of different data storage libraries on the market today, including models made by International Business Machines ("IBM"). A number of today's data storage libraries utilize the small computer system interface ("SCSI") medium changer standard. This standard is "location-centric" because it requires the host to manage cartridge movement by specifying source and destination locations in the system. Each location is a site capable of holding a cartridge, and is referred to as an "element." Each element is given a fixed element address, either at the time of manufacture or at the time of system installation or configuration. The SCSI medium changer protocol defines four types of elements: medium transport element, storage element, import/export element, and data transfer element. In physical terms, the medium transport element is an accessor gripper, a storage element is a storage slot, an import/export element is a library I/O slot or pass-through slot, and a data transfer element is a removable media drive.

Moves from one element to another are requested on the SCSI interface. Typically, moves from one element to another element are the responsibility of SCSI initiator software, also called independent software vendor programming. This includes moves between the I/O slots and the storage slots.

Even though some data storage libraries enjoy considerable commercial success today, IBM engineers are continually seeking to improve the performance and efficiency of these systems. One area of possible focus concerns the manner in which the library ejects cartridges and receives inserted cartridges. When an operator wishes to load a number of cartridges into a library without disrupting the accessor motion, the operator inserts the cartridges into the I/O slots. However, data storage libraries only have a finite number of I/O slots for use in transferring cartridges to and from the library. Consequently, eject/insert operations are blocked if the I/O slots fill up, until the independent software vendor programming moves the inserted cartridges to storage slots using the SCSI interface.

In addition, many libraries are slow to transfer cartridges into the library from I/O slots because they rely on human operators to issue commands to the host using a library control panel. This is because the host is needed to supervise cartridge insertion operations by issuing appropriate commands to library robotics. This situation may be exacerbated if the host is located remotely from the library, since the operator (and library control panel) are located at the host, but the operator must physically insert or remove cartridges from I/O slots at the library. Accordingly, the process of adding a large number of cartridges may involve many trips between the library's I/O station and the control panel.

Furthermore, when the independent software vendor programming needs to eject some cartridges by operator request or automatically, the operator must ensure there is an empty I/O slot for each cartridge. Otherwise, the attempt may be blocked, causing error, failure, or other delay. For these and other reasons, known data storage libraries are amenable to improvement.

SUMMARY OF THE INVENTION

Broadly, the present invention concerns a data storage library that efficiently utilizes I/O slots by automatically moving cartridges from physical I/O slots into physical storage slots; the invention also maintains software compatibility by using functional addresses to conduct virtual cartridge insert operations. More particularly, a location-centric library host manages cartridge movement according to functional storage addresses and functional I/O addresses. In reality, the library has multiple data storage cartridge receiving slots, which include physical I/O slots and physical storage slots. In contrast with the physical I/O slots and physical storage slots, functional I/O addresses and functional storage addresses are virtual locations used by the host in managing cartridge locations. Thus, host knowledge of cartridge locations is limited to their functional addresses. The library includes a library map that correlates functional addresses with physical addresses.

The library automatically empties new cartridges from the physical I/O slots into physical storage slots, using various steps. First, the library hardware automatically recognizes external placement of cartridges into the physical I/O slots. In response, the library identifies an empty one of the physical storage slots, and moves the cartridge into the empty physical storage slot. Additionally, the library associates a functional I/O address with the physical storage slot containing the cartridge.

Eventually, the library receives an insert command from the host, requesting transfer of the cartridge from its functional I/O address to a functional storage address. The library can immediately report the already-completed move in response to any host status requests. Ultimately, in response to the insert command, the library associates a functional storage address with the same physical storage slot that already contains the cartridge.

Accordingly, in one embodiment, the invention may be implemented to provide a method to manage insert operations in a data storage library. In another embodiment, the invention may be implemented to provide an apparatus, such as a data storage library, configured to manage insert operations as explained herein. In still another embodiment, the invention may be implemented to provide a signal-bearing medium tangibly embodying a program of machine-readable instructions executable by a digital data processing apparatus to perform operations for managing insert operations in a data storage library. Another embodiment concerns logic circuitry having multiple interconnected electrically conductive elements configured to perform operations in a data storage library as discussed herein.

The invention affords its users with a number of distinct advantages. Since the invention shuffles cartridges from physical I/O slots into physical storage slots without waiting for the host to direct transfer of the cartridges, the physical I/O slots are more frequently available to receive new cartridges. Operators are less likely to encounter full I/O slots. Additionally, the invention significantly reduces operator workload because the library automatically moves cartridges from physical I/O slots into storage slots without requiring the operator to access a control panel, wait until empty I/O slots become available, etc. As another advantage, the invention maintains broad software compatibly between the host and library controller. The invention also provides a number of other advantages and benefits, which should be apparent from the following description of the invention.

DETAILED DESCRIPTION

The nature, objectives, and advantages of the invention will become more apparent to those skilled in the art after considering the following detailed description in connection with the accompanying drawings.

HARDWARE COMPONENTS & INTERCONNECTIONS

Introduction

Figure 1:
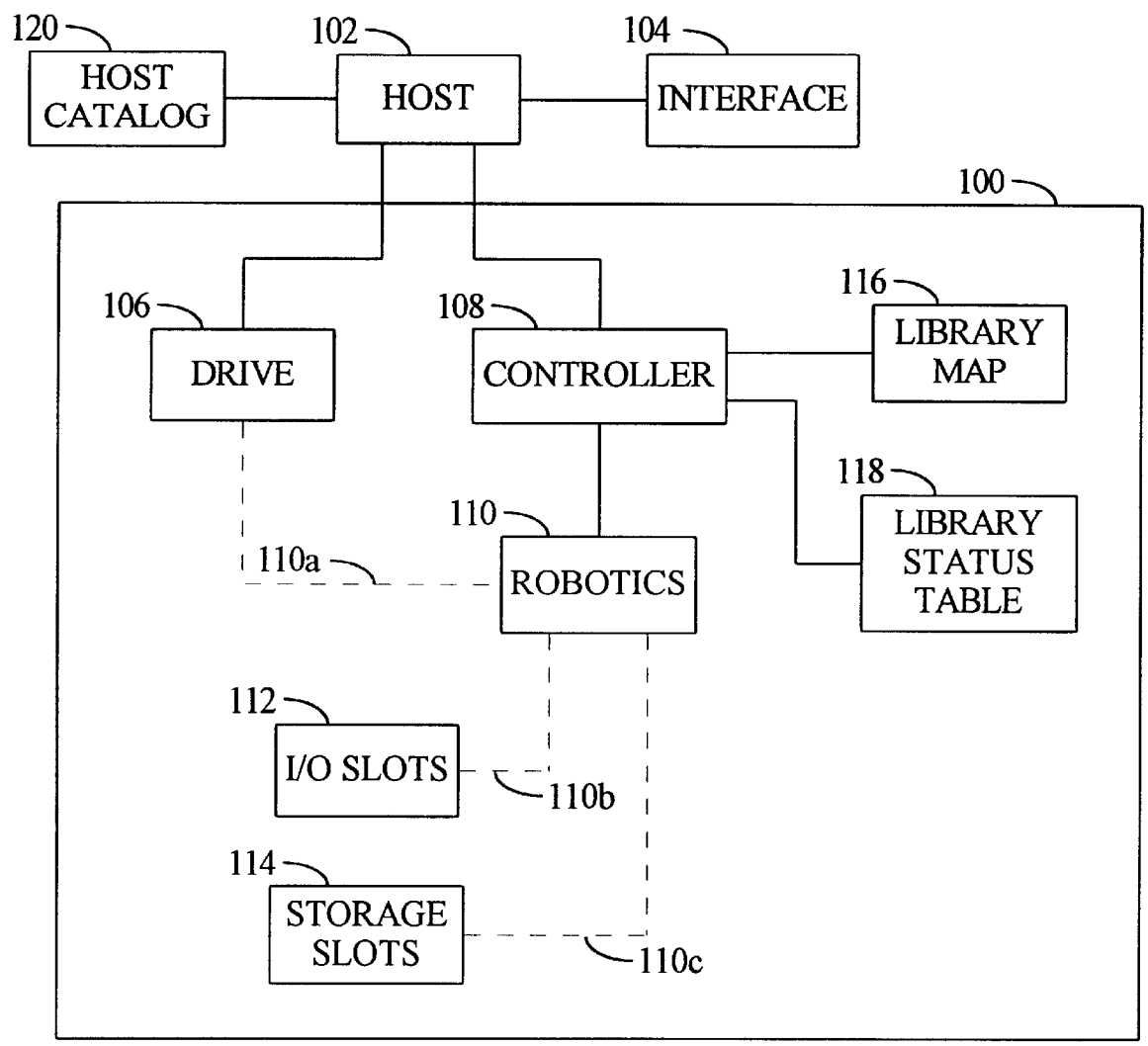
FIG. 1 is a block diagram of the hardware components and interconnections of a data storage system according to the invention.

One aspect of the invention concerns a data storage system, which may be embodied by various hardware components and interconnections, with one example being described in FIG. 1. FIG. 1 shows a data storage library 100 coupled to a hierarchically superior host 102. The library 100 may include one or different types of portable data storage media, such as magnetic tape cartridges, optical cartridges, writeable CDs, etc. For ease of reference, the portable data storage media of the library 100 are referred to as "cartridges."

Host

Among other possible functions, the host 102 supplies data to the library 100 for storage on the cartridges, and sends requests to the library 100 to retrieve data from the cartridges. The host role may be satisfied by various types of hardware, such as a digital data processing computer, logic circuit, construction of discrete circuit components, interface to a human operator, etc. As an example, the host 102 may comprise an IBM RS/6000 machine employing an operating system such as AIX. The host 102 is also coupled to an interface 104 and a host catalog 120. The interface 104 enables the host 102 to exchange information with a human operator, and may comprise a control panel, video monitor, computer keyboard/mouse, or another appropriate human/machine interface.

The host 120 manages data in the library 100 using "location-centric" commands, and may utilize the SCSI medium changer protocol as one example. The host manages cartridge movement by specifying source and destination locations in the system. According to the present invention, the source and destination locations are "functional addresses," rather than physical storage sites. The functional addresses may also be considered "imaginary" or "virtual" storage addresses, since they do not necessarily correspond to physical storage sites in the library 100 (although they might on an incidental basis). Nonetheless, to satisfy the host's location-centric nature, the host 102 associates each functional address with various physical attributes, such as a medium transport element, storage element, import/export element, or data transfer element. In the illustrated example, the host's functional addresses include "functional I/O addresses" (which the host perceives to be I/O slots) and "functional storage addresses" (which the host perceives to be storage slots). As an example, the host's functional addresses may be established upon configuration of the library 100 with the host 102, and would not normally change. There is a different, underlying layer of mapping that correlates the host's functional addresses with the actual storage sites, called "physical storage addresses." This configuration introduces several benefits for the library 100, as discussed in greater detail below.

To support its management of the data storage library 100 according to functional addresses, the host 102 maintains the host catalog 120. The host catalog 120 cross-references each functional address with any data storage cartridge that is stored therein, according to the host's view. TABLE 1 shows an example of the catalog 120. Each row depicts one functional address, and cross-references this address against:

1. The type of imaginary location in the data storage library 100 represented by the functional address. This information, which includes whether the functional address is a "functional I/O address" or a "functional storage address," is fixed during operation of the host 102.

2. Whether the functional address contains a cartridge or not; this information varies during normal operation of the library 100.

3. The identity of the cartridge (if any) stored at the functional address; one type of identification is by volume serial number ("VOLSER"), as illustrated. This information varies during normal operation of the library 100.

TABLE 1

HOST CATALOG

| FUNCTIONAL ADDRESS (FIXED) | TYPE (FIXED) | FULL OR EMPTY? (CHANGEABLE) | VOLSER (CHANGEABLE) |
|---|---|---|---|
| 001 | FUNCTIONAL STORAGE ADDRESS | FULL | 929475 |
| 002 | FUNCTIONAL STORAGE ADDRESS | FULL | 988928 |
| 003 | FUNCTIONAL STORAGE ADDRESS | FULL | 329820 |
| 004 | FUNCTIONAL STORAGE ADDRESS | EMPTY | NONE |
| ... | ... | ... | ... |
| 098 | FUNCTIONAL I/O ADDRESS | FULL | 333820 |
| 099 | FUNCTIONAL I/O ADDRESS | EMPTY | NONE |
| 100 | FUNCTIONAL I/O ADDRESS | EMPTY | NONE |

Drive

The data storage library 100 includes a drive 106 to conduct read/write operations with cartridges in the library 100. The library 100 may utilize multiple drives 106 if desired. Each drive 106 comprises suitable hardware to access the format of data storage cartridge in the library 100. For example, in the case of magnetic tape cartridges, the drive 106 may comprise an IBM model 3590 tape drive. Cartridges are directed to/from the drive 106 by robotics 110, described below.

Physical Cartridge Storage & Management

The library 100 also includes equipment to physically move and store the cartridges. For instance, physical storage slots 114 house cartridges when they are not being used. The physical storage slots 114 comprise shelves or other data storage library compartments.

Physical I/O slots 112 are provided to transfer cartridges to/from the library 100. The physical I/O slots 112 include any slots that are marked, known, set aside, positioned, or otherwise designated for operator to insert cartridges into the library and remove cartridges therefrom. Using the I/O slots 112, an operator can introduce cartridges into the library 100 ("insert" operation), or the library 100 can expel cartridges ("eject" operation). The physical I/O slots 112 may be accessible by the operator without disrupting operation of the robotics 112 or drive 106 (such as through an external door), although this is not necessary. Some examples of physical I/O slots 112 include "pass-through" slots, a carriage, conveyor, normal storage-type slots designated as I/O slots, etc.

To move cartridges between the drive 106, I/O slots 112, and storage slots 114, the library 100 includes robotics 110. The robotics 110 accesses these components by respective paths 110a, 110b, and 110c. The robotics 110 may be implemented by any suitable cartridge movement machinery, such as robotic arms, integrated cartridge loading equipment, conveyors, grippers movable on an x-y coordinate system, etc.

Controller

The library 100 operates under supervision of a controller 108, which receives commands from the host 102 requesting the controller 108 to move cartridges from one functional address to another. The controller 108 communicates with the host 102 by interfaces such as wires/cables, one or more busses, fiber optic lines, wireless transmission, intelligent communications channel, etc. In addition to this host-controller interface, which constitutes a "control" path, the library 100 also includes a "data" path that carries data between the host 102 and the drive 106.

The controller 108 comprises a digital data processing machine, logic circuit, construction of discrete circuit components, or other automated mechanism, and operates according to suitable programming, physical configuration, etc. To provide a specific example, the controller 108 may comprise an IBM PowerPC processor.

After receiving location-centric commands from the host 102 referencing imaginary "functional addresses," the controller 108 translates these commands into physical locations present in the library 100 and implements the requested operations by directing the robotics 110. To map between the host's functional addresses and the library's physical storage locations, the controller 108 maintains a library database including a library map 116 and library status table 118.

For each functional address, the library map 116 identifies a corresponding physical storage address, if one has been associated with that functional address. TABLE 2 shows an example of the library map 116. Each row depicts one functional address and the associated physical storage address. In this example, the physical storage addresses comprise horizontal-vertical coordinates for a robotic gripper.

TABLE 2

LIBRARY MAP

| FUNCTIONAL ADDRESS (FIXED) | TYPE OF FUNCTIONAL ADDRESS (FIXED) | ASSOCIATED PHYSICAL ADDRESS (CHANGEABLE) |
|---|---|---|
| 001 | STORAGE | (1,1) LEFT |
| 002 | STORAGE | (1,1) RIGHT |
| 003 | STORAGE | (1,2) LEFT |
| 004 | STORAGE | UNASSOCIATED |
| ... | ... | ... |
| 098 | I/O | (4,5) LEFT |
| 099 | I/O | UNASSOCIATED |
| 100 | I/O | UNASSOCIATED |

The library status table 118 (TABLE 3) lists all physical storage addresses in the library 100. This listing depends upon the physical configuration of the library 100, which is established upon manufacture, initial configuration, etc. Also, for each physical storage address, the library status table 118 tells:

1. Whether the physical storage address contains a cartridge or not, which may change from time to time.

2. What physical configuration embodies that physical storage address (e.g., read/write drive, storage slot, I/O slot, etc.). This is fixed at an appropriate time, such as the initial configuration of the library.

3. The VOLSER or other identity of cartridge stored in the physical storage address. This changes from time to time, as cartridges are moved about in the library.

electromagnetic link, or other means for the processor 202 to exchange data with other hardware external to the apparatus 200.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206, 208 may be eliminated; furthermore, the storage 204 may be provided on-board the processor 202, or even provided externally to the apparatus 200.

Logic Circuitry

In contrast to the digital data storage apparatus discussed previously, a different embodiment of the invention uses

TABLE 3

LIBRARY STATUS TABLE

| PHYSICAL ADDRESS (FIXED) | FULL OR EMPTY? (CHANGEABLE) | CONFIGURATION OF PHYSICAL ADDRESS (FIXED) | VOLSER (CHANGEABLE) |
|---|---|---|---|
| (1,1) LEFT | FULL | STORAGE SLOT | 929475 |
| (1,1) RIGHT | FULL | STORAGE SLOT | 988928 |
| (1,2) LEFT | FULL | STORAGE SLOT | 329820 |
| ... | ... | ... | ... |
| (4,5) LEFT | FULL | I/O SLOT | 333820 |
| (5,8) RIGHT | EMPTY | I/O SLOT | NONE |
| ... | ... | ... | ... |
| (10,10) RIGHT | EMPTY | DRIVE | NONE |

Exemplary Digital Data Processing Apparatus

The controller 108 may be implemented in various forms, including a digital data processing apparatus as one example. This apparatus may be embodied by various hardware components and interconnections; one example is the digital data processing apparatus 200 of FIG. 2. The apparatus 200 includes a processor 202, such as a microprocessor or other processing machine, coupled to a storage 204. In the present example, the storage 204 includes a fast-access storage 206, as well as nonvolatile storage 208. The fast-access storage 206 may comprise random access memory ("RAM"), and may be used to store the programming instructions executed by the processor 202. The nonvolatile storage 208 may comprise, for example, one or more magnetic data storage disks such as a "hard drive," a tape drive, or any other suitable storage device. The apparatus 200 also includes an input/output 210, such as a line, bus, cable, logic circuitry instead of computer-executed instructions to implement the controller 108. Depending upon the particular requirements of the application in the areas of speed, expense, tooling costs, and the like, this logic may be implemented by constructing an application specific integrated circuit ("ASIC") having thousands of tiny integrated transistors. Such an ASIC may be implemented with CMOS, TTL, VLSI, or another suitable construction. Other alternatives include a digital signal processing chip ("DSP"), discrete circuitry (such as resistors, capacitors, diodes, inductors, and transistors), field programmable gate array ("FPGA"), programmable logic array ("PLA"), and the like.

OPERATION

In addition to the various hardware embodiments described above, a different aspect of the invention concerns a method, discussed below.

Signal-Bearing Media

Figure 2:
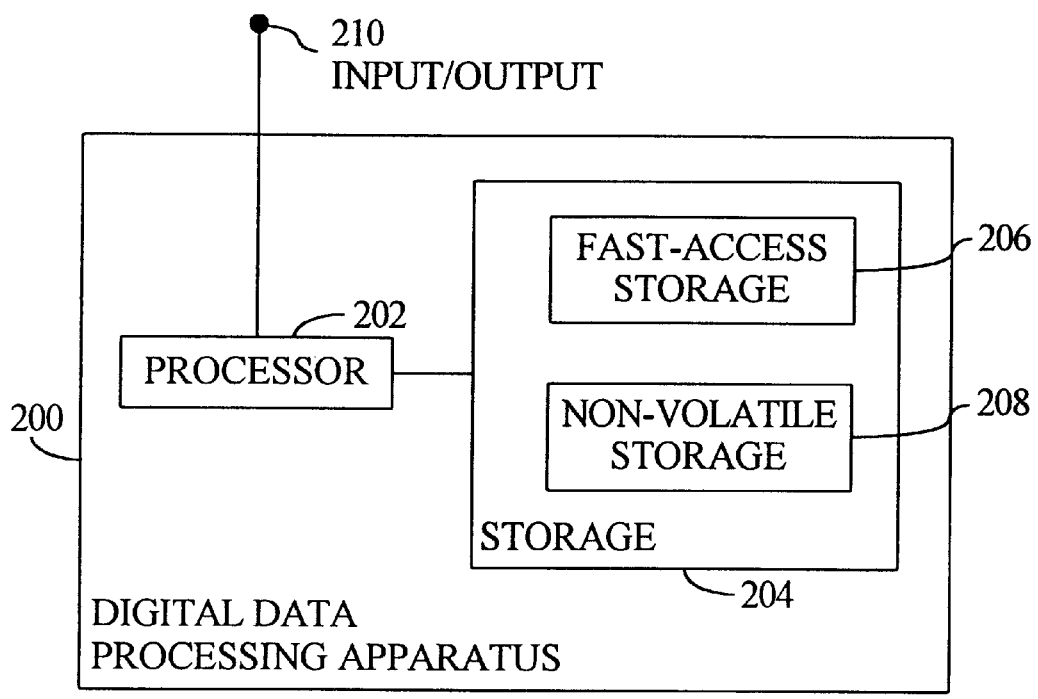
FIG. 2 is a block diagram of a digital data processing machine according to the invention.

In the context of FIGS. 1–2, such a method may be implemented, for example, by operating the controller 108, as embodied by a digital data processing apparatus 200, to execute various sequences of machine-readable instructions. These instructions may reside in various types of signal-bearing media. In this respect, one aspect of the present invention concerns a programmed product, comprising signal-bearing media tangibly embodying a program of machine-readable instructions executable by a digital data processor to perform a method of managing eject operations in the data storage library 100.

Figure 3:
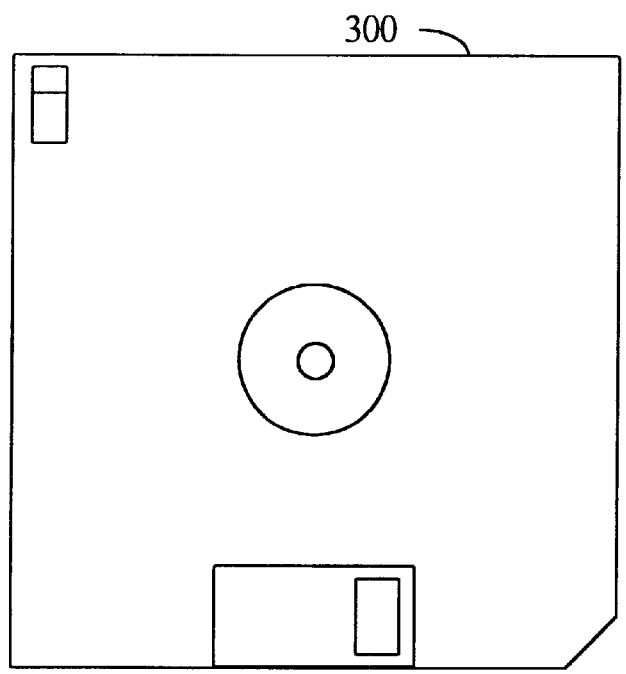
FIG. 3 shows an exemplary signal-bearing medium according to the invention.

This signal-bearing media may comprise, for example, RAM (not shown) contained within the controller 108, as represented by the fast-access storage 206. Alternatively, the instructions may be contained in another signal-bearing media, such as a magnetic data storage diskette 300 (FIG. 3), directly or indirectly accessible by the processor 200. Whether contained in the storage 206, diskette 300, or elsewhere, the instructions may be stored on a variety of machine-readable data storage media, such as direct access storage (e.g., a conventional "hard drive," redundant array of inexpensive disks ("RAID"), or another DASD), magnetic tape, electronic read-only memory (e.g., ROM, EPROM, or EEPROM), optical storage (e.g., CD-ROM, WORM, DVD, digital optical tape), paper "punch" cards, or other suitable signal-bearing media including transmission media such as digital and analog and communication links and wireless. In an illustrative embodiment of the invention, the machine-readable instructions may comprise software object code, compiled from a language such as "C," etc.

Logic Circuitry

In contrast to the signal-bearing medium discussed above, the method aspect of the invention may be implemented using logic circuitry, without using a processor to execute instructions. In this embodiment, the logic circuitry is implemented in the controller 108, and is configured to perform operations to implement the method of the invention. The logic circuitry may be implemented using many different types of circuitry, as discussed above.

Cartridge Insertion

Figure 4:
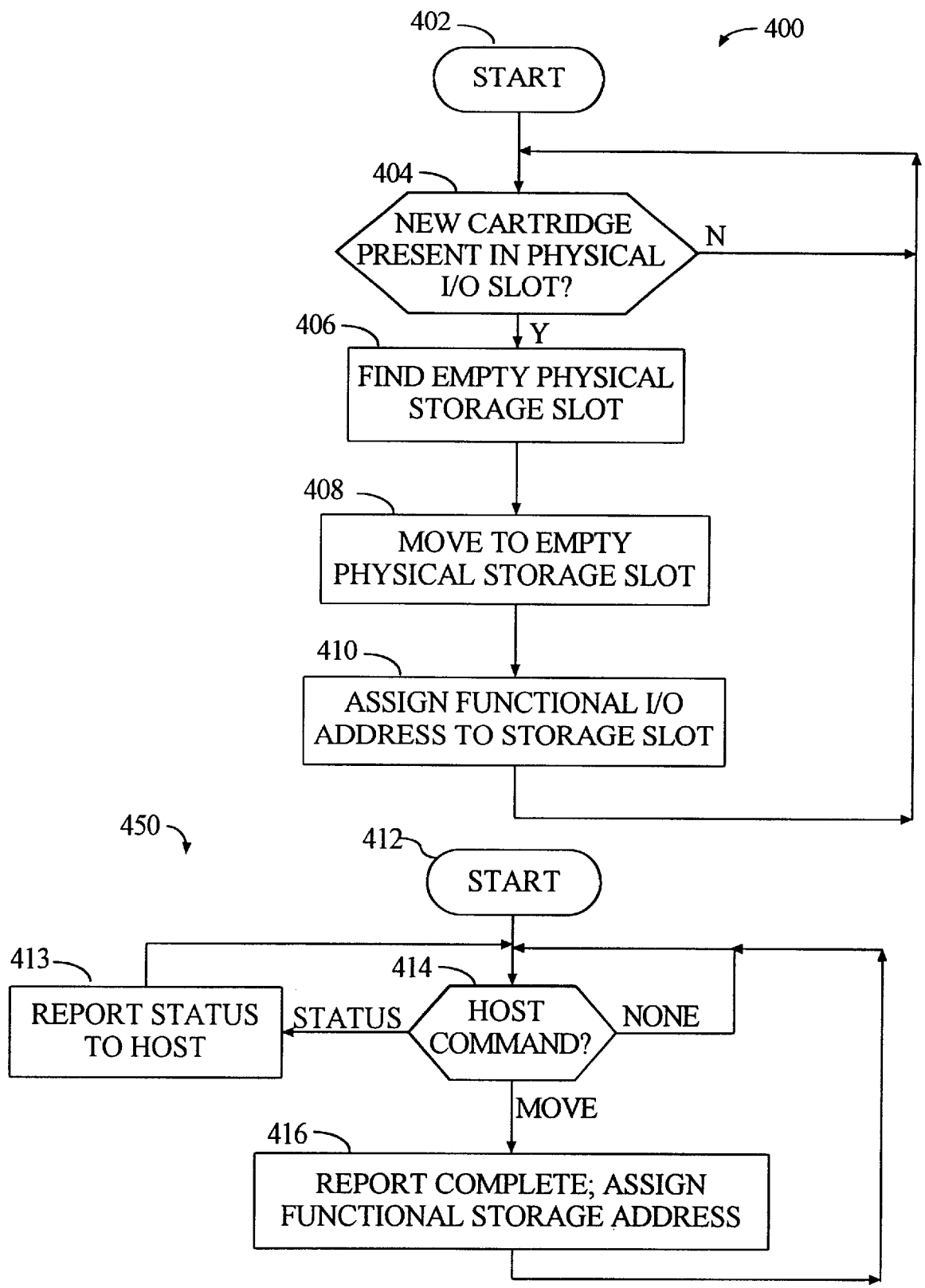
FIG. 4 depicts flowcharts of cartridge intake sequences according to the invention.

FIG. 4 shows cartridge intake sequences 400/450, to provide one example of the invention. For ease of explanation, but without any intended limitation, the example of FIG. 4 is described in the context of the hardware components and interconnections shown in FIG. 1, described above.

In the routine 400, the controller 108 manages the library 100 to automatically empty new cartridges from the physical I/O slots 112. This helps the operator by ensuring that the I/O slots do not fill up, which would prevent the operator from inserting more cartridges. This also facilitates eject operations, since the controller 108 is more likely to find an available physical I/O slot. Another benefit of the routine 400 is that the controller 108 automatically recognizes external placement of a cartridge into the physical I/O slots 112. The sequence 400 automatically empties cartridges from the physical I/O slots 112 regardless of any host involvement.

The sequence 400 is initiated in step 402. In step 404, the controller 108 determines whether any new cartridge(s) have been placed into the I/O slots 112. This step may be performed by physically checking the physical I/O slots 112 ("polling") according to a desired repeating schedule, polling the physical I/O slots 112 whenever a door to the physical I/O slots is opened, etc. As an alternative, some or all of the physical I/O slots 112 may include sensors that are activated when a cartridge is received. When step 404 finds a newly inserted cartridge, the controller 108 accesses the library status table 118 to identify an empty physical storage slot 114 (step 406), and then moves the inserted cartridge there (step 408). Step 408 also updates the library status table 118 to show the cartridge's presence in the empty storage slot. Step 408 has the effect of quickly clearing the physical I/O slot 112 where the cartridge was inserted, making it available for other insert or eject operations. Moreover, this step is invisible to the host 102.

After step 408, the controller 108 makes the cartridge known to the host 102. First, the controller 108 selects an available functional I/O address from the library map 116, and updates the library map 116 to associate this functional I/O address with the physical storage slot that now contains the cartridge (step 410). After step 410, the routine 400 returns to step 404 to process any other newly inserted cartridges.

Apart from the sequence 400, the sequence 450 is performed by the controller 108 to assist the host 102 in completing the cartridge insertion operation. The sequence 450 begins in step 412. In step 414, the controller 108 determines whether it has received any host commands. In response to a host status command, the controller 108 reports the newly received cartridge to the host 102 (step 413). Particularly, the controller 108 reports the cartridge's functional I/O address (from step 410) and VOLSER to the host 102. This is how the host 102 learns of the cartridge's presence in the library, namely, by querying the controller 108. After the host 102 becomes aware of the new cartridge's presence in the functional I/O address (via step 413), the host 102 responds (not shown) by updating its host catalog 120 to show the functional I/O address as "full," and entering the cartridge's VOLSER or other identity. Then, at some later time depending upon host programming, the host 102 elects to move the cartridge from its functional I/O address into a functional storage address. When this occurs, the host 102 sends an appropriate "insert" command, which is received by the controller 108 in step 414. The controller 108 reflexively responds to the insert command of step 414 with an immediate report that the requested insertion has been completed (step 416). To actually carry out insert operation, the controller 108 performs certain additional steps as part of step 416, these additional steps being invisible to the host 102. Namely, as the cartridge already resides in a physical storage slot, no physical movement is needed. Instead, the controller 108 chooses an available functional storage address from the library map 116 and associates it with the cartridge's physical storage address by updating the library map 116 (step 416). The controller 108 also de-associates the cartridge's previous functional I/O address by listing this functional I/O address as "unassociated" in the library map 116. After step 416, the controller 108 returns to step 414 to await another host command.

With the benefit of this disclosure, ordinarily skilled artisans should recognize that the order of operations within the sequences 400, 450 may be changed in certain respects without departing from this invention. Moreover, although the foregoing sequences 400, 450 have been described in a rigid, serial form for ease of illustration, some of the operations 400, 450 may employ hardware interrupts or multitasking to perform concurrent operations for different cartridges, etc.

Cartridge Ejection

Figure 5:
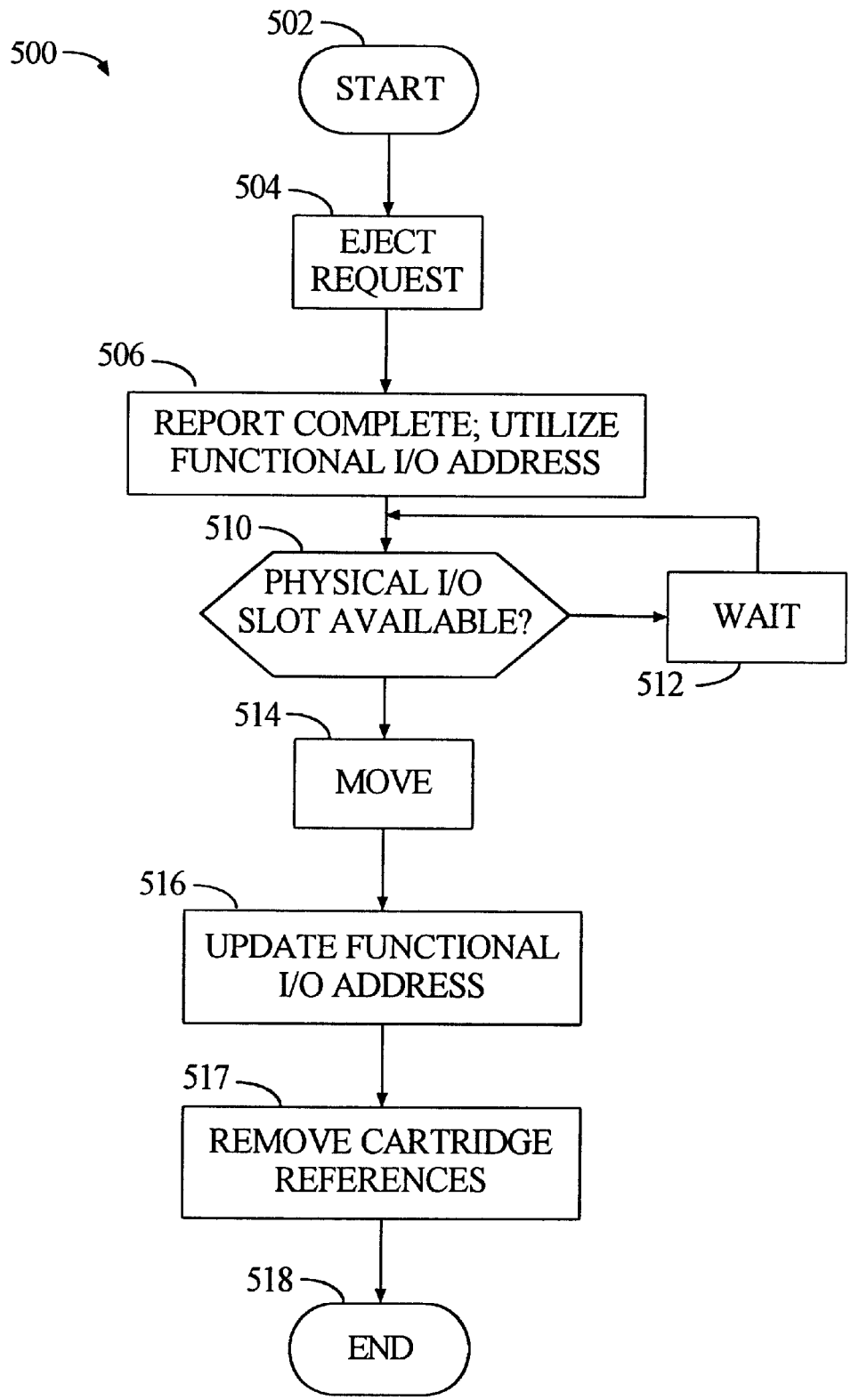
FIG. 5 is a flowchart of an operational sequence for processing host eject commands according to the invention.

FIG. 5 shows one example of a cartridge ejection sequence 500. For ease of explanation, but without any intended limitation, the example of FIG. 5 is described in the context of the hardware components and interconnections shown in FIG. 1, described above.

Advantageously, the controller 108 manages the library 100 to perform a near immediate virtual eject, so that the host 102 is never blocked by the perception of full physical I/O slots. As shown below, this is done by immediately associating a functional I/O address with the cartridge's current physical storage slot, whether any physical I/O slots are available or not.

The steps 500 are initiated in step 502. In step 504, the controller 108 receives an eject request from the host 102. The eject request, which is location-centric in accordance with host programming, tells the controller 108 to move the cartridge from a specified functional storage address to a specified, available functional I/O address. In response, the controller 108 reflexively reports that the requested eject operation is complete (step 506), thereby satisfying the host request promptly. At this time, the host 102 may delete the cartridge from the host catalog 120 (step not shown); alternatively, the host 102 may wait until the cartridge is physically removed from the library or another appropriate event, determined by querying the controller 108. To actually carry out the eject request, the controller 108 performs certain other steps, which are invisible to the host 102. Namely, the controller 108 updates the library map 116 to free the functional storage address currently associated with the physical storage slot, and replace the functional storage address with the specified functional I/O address step (step 506). This achieves a near immediate virtual eject, since the host 102 now perceives the cartridge to be located in an I/O slot.

As an alternative to steps 504–506 as illustrated above, the host's eject request may omit the functional I/O address, leaving the controller 108 identify, select, and report (when queried) an available functional I/O address.

After step 506, the controller 108 checks to see whether a physical I/O slot is available (step 510) to truly eject the cartridge. If not, the controller 108 waits in step 512, and then repeats step 510. One implementation of step 512, for example, involves entering the cartridge-to-be-ejected into queue that advances each time a physical I/O slot becomes available.

When a physical I/O slot becomes available for the awaiting cartridge, the controller 108 moves the subject cartridge into the available physical I/O slot (step 514). Then, the controller 108 updates the library map 116 (step 516) so that the cartridge's current functional I/O address is associated with the cartridge's physical I/O address, instead of the physical storage address of its previously occupied storage slot. Additionally, the controller 108 updates the library status table 118 to show the cartridge's presence in the physical I/O slot.

After step 516, the controller 108 waits until the cartridge is removed from its physical I/O slot by a human operator, another machine, etc. At this time, the controller 108 updates the library map 116 and library status table 118 to show removal of the cartridge from the library (step 517). As an alternative, the controller 108 may omit step 516, in which case the cartridge's move to its physical I/O slot is not recorded. After step 517, the eject routine 500 ends in step 518.

OTHER EMBODIMENTS

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated. Additionally, ordinarily skilled artisans will recognize that operational sequences must be set forth in some specific order for the purpose of explanation and claiming, but the present invention contemplates various changes beyond such specific order.

What is claimed is:

1. A method for managing insert operations in a data storage library having multiple slots to receive data storage cartridges, the slots having physical addresses and including one or more physical I/O slots and multiple physical storage slots, where the library includes a controller coupled to a location-centric host that manages cartridge location according to functional storage addresses and functional I/O addresses, and the library includes a library database associating functional addresses with physical addresses, the method comprising the following operations performed by the controller:

automatically recognizing external placement of a cartridge into the physical I/O slots;

identifying an empty one of the physical storage slots;

moving the cartridge into the empty physical storage slot;

selecting an available functional I/O address;

updating the library database to exclusively associate the available functional I/O address with the physical storage slot containing the cartridge;

advising the host that the available functional I/O address contains a cartridge;

responsive to receiving an insert request from the host, the insert request requesting transfer of the cartridge from the available functional I/O address to a target functional storage address, performing operations comprising:

reporting completion of the insert to the host;

updating the library database to associate the target functional storage address with the physical storage slot containing the cartridge and disassociate the available functional I/O address from the physical slot containing the cartridge.

2. The method of claim 1, the operation of recognizing external placement of a cartridge into the physical I/O slots comprising:

receiving signals from detection components of the library that automatically activate in response to physical placement of the cartridge.

3. The method of claim 1, the operation of recognizing external placement of a cartridge into the physical I/O slots comprising:

polling the physical I/O slots upon a prescribed schedule to determine whether any new cartridges have been placed therein.

4. The method of claim 1, the operations further comprising:

maintaining a host-accessible catalog showing the associations between functional addresses and cartridges.

5. The method of claim 1, the library database including:

a library status map showing the associations between functional addresses and physical addresses;

a library status table listing each physical address and identifying any cartridge contained therein.

6. The method of claim 1, the cartridges comprising magnetic tape cartridges.

7. A signal-bearing medium tangibly embodying a program of machine-readable instructions executable by a digital processing apparatus to perform a method for managing insert operations in a data storage library having multiple slots to receive data storage cartridges, the slots having physical addresses and including one or more physical I/O slots and multiple physical storage slots, where the library includes the digital data processing apparatus and the apparatus is coupled to a location-centric host that manages cartridge location according to functional storage addresses and functional I/O addresses, and the library includes a library database associating functional addresses with physical addresses, the method comprising the operations of:

automatically recognizing external placement of a cartridge into the physical I/O slots;

identifying an empty one of the physical storage slots;

moving the cartridge into the empty physical storage slot;

selecting an available functional I/O address;

updating the library database to exclusively associate the available functional I/O address with the physical storage slot containing the cartridge;

advising the host that the available functional I/O address contains a cartridge;

responsive to receiving an insert request from the host, the insert request requesting transfer of the cartridge from the available functional I/O address to a target functional storage address, performing operations comprising:

reporting completion of the insert to the host;

updating the library database to associate the target functional storage address with the physical storage slot containing the cartridge and disassociate the available functional I/O address from the physical slot containing the cartridge.

8. The medium of claim 7, the operation of recognizing external placement of a cartridge into the physical I/O slots comprising:

receiving signals from detection components of the library that automatically activate in response to physical placement of the cartridge.

9. The medium of claim 7, the operation of recognizing external placement of a cartridge into the physical I/O slots comprising:

polling the physical I/O slots upon a prescribed schedule to determine whether any new cartridges have been placed therein.

10. The medium of claim 7, the operations further comprising:

maintaining a host-accessible catalog showing the associations between functional addresses and cartridges.

11. The medium of claim 7, the library database including:

a library status map showing the associations between functional addresses and physical addresses;

a library status table listing each physical address and identifying any cartridge contained therein.

12. The medium of claim 7, the cartridges comprising magnetic tape cartridges.

13. A logic circuit of multiple interconnected electrically conductive elements configured to perform operations to signal-bearing medium tangibly embodying a program of machine-readable instructions executable by a digital processing apparatus to perform a method to manage insert operations in a data storage library having multiple slots to receive data storage cartridges, the slots having physical addresses and including one or more physical I/O slots and multiple physical storage slots, where the library includes the logic circuit and the logic circuit is coupled to a location-centric host that manages cartridge location according to functional storage addresses and functional I/O addresses, and the library includes a library database associating functional addresses with physical addresses, the method comprising the operations of:

automatically recognizing external placement of a cartridge into the physical I/O slots;

identifying an empty one of the physical storage slots;

moving the cartridge into the empty physical storage slot;

selecting an available functional I/O address;

updating the library database to exclusively associate the available functional I/O address with the physical storage slot containing the cartridge;

advising the host that the available functional I/O address contains a cartridge;

responsive to receiving an insert request from the host, the insert request requesting transfer of the cartridge from the available functional I/O address to a target functional. storage address, performing operations comprising:

reporting completion of the insert to the host;

updating the library database to associate the target functional storage address with the physical storage slot containing the cartridge and disassociate the available functional I/O address from the physical slot containing the cartridge.

14. A data storage library, comprising:

multiple slots to receive data storage cartridge, the slots including one or more physical I/O slots and multiple physical storage slots, each slot having a physical address;

robotics to move cartridges among various locations including the slots;

a controller coupled to the robotics and to a location-centric host that manages cartridge location according to functional storage addresses and functional I/O addresses;

a library database, accessible by the controller, correlating functional addresses with physical addresses;

where the controller is configured to perform operations to carry out insert requests from the host, the operations comprising:

automatically recognizing external placement of a cartridge into the physical I/O slots;

identifying an empty one of the physical storage slots;

moving the cartridge into the empty physical storage slot;

selecting an available functional I/O address;

updating the library database to exclusively associate the available functional I/O address with the physical storage slot containing the cartridge;

advising the host that the available functional I/O address contains a cartridge;

responsive to receiving an insert request from the host, the insert request requesting transfer of the cartridge from the available functional I/O address to a target functional storage address, performing operations comprising:

reporting completion of the insert to the host;

updating the library database to associate the target functional storage address with the physical storage slot containing the cartridge and disassociate the available functional I/O address from the physical slot containing the cartridge.

15. The library of claim 14, the operation of recognizing external placement of a cartridge into the physical I/O slots comprising:
receiving signals from detection components of the library that automatically activate in response to physical placement of the cartridge.

16. The library of claim 14, the operation of recognizing external placement of a cartridge into the physical I/O slots comprising:
polling the physical I/O slots upon a prescribed schedule to determine whether any new cartridges have been placed therein.

17. The library of claim 14, the operations further comprising:
maintaining a host-accessible catalog showing the associations between functional addresses and cartridges.

18. The library of claim 14, the library database including:
a library status map showing the associations between functional addresses and physical addresses;
a library status table listing each physical address and identifying any cartridge contained therein.

19. The library of claim 14, further including the cartridges.

20. A data storage library, comprising:
multiple slots to receive data storage cartridge, the slots including one or more physical I/O slots and multiple physical storage slots, each slot having a physical address;
robotic means for moving cartridges among various locations including the slots;
controller means coupled to the robotic equipment and to a location-centric host that manages cartridge location according to functional storage addresses and functional I/O addresses;
a library database, accessible by the controller means, correlating functional addresses with physical addresses;
where the controller means is configured for carrying out insert requests from the host by:
automatically recognizing external placement of a cartridge into the physical I/O slots;
identifying an empty one of the physical storage slots;
moving the cartridge into the empty physical storage slot;
selecting an available functional I/O address;
updating the library database to exclusively associate the available functional I/O address with the physical storage slot containing the cartridge;
advising the host that the available functional I/O address contains a cartridge;
responsive to receiving an insert request from the host, the insert request requesting transfer of the cartridge from the available functional I/O address to a target functional storage address, performing operations comprising:
reporting completion of the insert to the host;
updating the library database to associate the target functional storage address with the physical storage slot containing the cartridge and disassociate the available functional I/O address from the physical slot containing the cartridge.

* * * * *

UNITED STATES PATENT AND TRADEMARK OFFICE
CERTIFICATE OF CORRECTION

PATENT NO. : 6,480,905 B1
DATED : November 12, 2002
INVENTOR(S) : Leonard George Jesionowski et al.

It is certified that error appears in the above-identified patent and that said Letters Patent is hereby corrected as shown below:

Column 13,
Lines 63-66, delete "to signal-bearing medium tangibly embodying a program of machine-readable instructions executable by a digital processing apparatus."

Column 14,
Line 24, delete the period "." between "tional" and "storage".

Signed and Sealed this

Seventeenth Day of June, 2003

JAMES E. ROGAN
*Director of the United States Patent and Trademark Office*